Aug. 13, 1963  M. CHERUNDOLO ETAL  3,100,407
MULTIPLE SPINDLE ATTACHMENT
Filed March 30, 1962

INVENTORS
MICHAEL CHERUNDOLO
JOHN B. WANDEL
BY C. A. Weigel, Jr.
ATTORNEY

United States Patent Office 3,100,407
Patented Aug. 13, 1963

3,100,407
MULTIPLE SPINDLE ATTACHMENT
Michael Cherundolo and John B. Wandel, Scranton, Pa., assignors to Daystrom, Incorporated, Murray Hill, N.J., a corporation of Texas
Filed Mar. 30, 1962, Ser. No. 183,896
2 Claims. (Cl. 77—22)

This invention relates to machine tool attachments and, more particularly, to a turret drilling attachment having multiple spindles for typical use with automatic screw machines.

In the prior art, turret drilling attachments have permitted successive operations to be performed on the work piece with only one set up. These prior art turret drilling attachments have proven quite satisfactory, but unfortunately have certain disadvantages. One of these disadvantages is that they cannot be used efficiently on work pieces requiring (1) the use of more than one small drill or (2) off-center cutting operations. In such situations, the prior practice required taking the work piece off the automatic screw machine, washing it, and setting it up a second time in either the same machine, or a separate drilling machine. This procedure had to be repeated for each and every off-center hole drilled in the work piece.

It is an object of this invention, therefore, to obviate many of the disadvantages of prior art.

Another object of this invention is to simultaneously actuate multiple spindles.

Still another object of this invention is to provide a turret drilling attachment for an automatic screw machine that is capable of drilling multiple holes.

In accordance with this invention a novel turret drilling attachment is provided which transmits power simultaneously to plural spindles. Appropriate cutting tools may be inserted in the respective spindles. The power is transmitted through a discontinuous drive shaft to the plural spindles. The discontinuous drive shaft includes a gear train having an internal ring gear and separate spur gears for each of the several spindles. The several spur gears mesh with the internal ring gear to simultaneously drive their respective spindles. One advantage of the discontinuous drive shaft is that it permits the cutting tools to be adjusted relative to the work piece without disturbing the initial setup.

Further advantages and features of ths invention will become apparent upon consideration of the following description read in conjunction wtih the drawing wherein.

Figure 3:
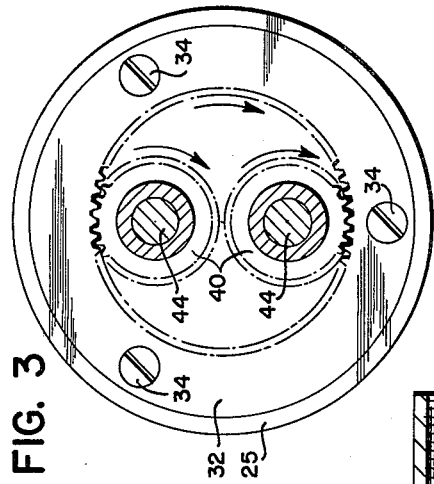
FIG. 3 is a transverse section view of the attachment illustrated in FIG. 1 taken along the section line 3—3 of FIG. 2.
Figure 2:
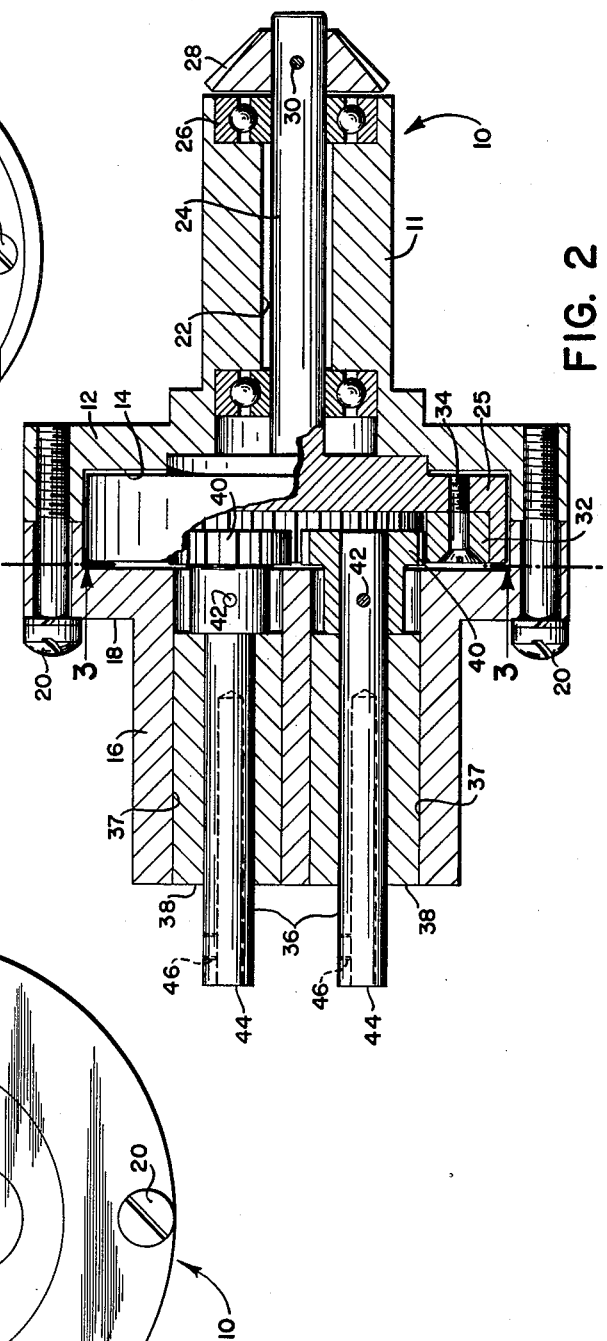
FIG. 2 is a longitudinal elevation view of the attachment illustrated in FIG. 1, shown mainly in section.

The drilling attachment of this invention is illustrated in the drawings, as having two major parts; the shank 10 and the spindle housing 16. The shank 10 is an integral piece having an elongated hollow cylindrical portion 11 and an enlarged flanged portion 12. The end of the flanged portion 12 has a hollow cylindrical recess 14 such that the flanged portion 12 assumes a cup-like shape. The elongated portion 11 is designed such that it may fit into the turret of a conventional automatic screw machine, for example. A central bore 22 is formed in the shank 10 to extend its entire length. The circular recess 14 is concentric with the bore 22 and serves as a seat for a main drive or shank spindle 24 which is suitably supported by ball bearings 26 mounted in the bore 22. Where high speed requirements exist, special carbide bearings may be substituted for the ball bearings as necessary.

The main drive or shank spindle 24 has a bevel gear 28 rigidly attached to one end as by a pin 30. At its opposite end, there is formed on the main drive spindle 24 an enlarged, flanged portion that has a circular recess, concentric with the main drive spindle 24. An internal ring or sun gear 32 is attached by screws 34 to the circular recess in the flanged portion 25 of the spindle 24. The bevel gear 28 is adapted to engage the large bevel gear (not shown) in the turret of an automatic screw machine. It should be noted that for many applications, a spline, universal or similar connection may be substituted for the bevel gear 28.

Figure 1:
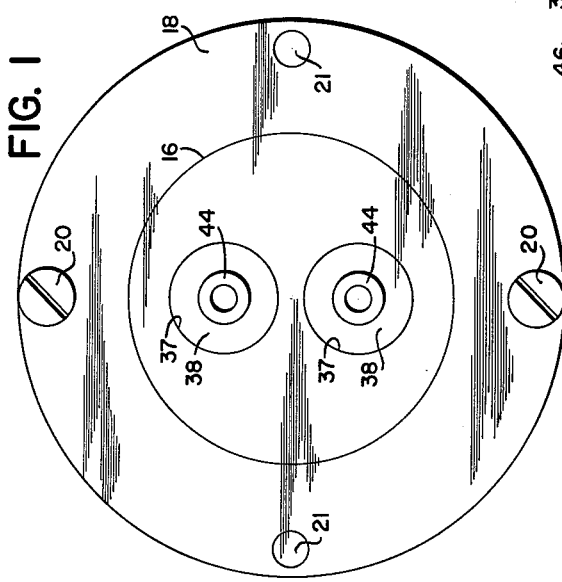
FIGURE 1 is an end elevation view of the multiple spindle attachment constructed in accordance with this invention.

The spindle housing 16 includes an enlarged flanged portion 18 which is attached to the flanged portion 12 by screws 20. Pins 21 (FIG. 1) may be used to provide additional support and alignment such that the major axes of the spindle housing 16 and shank 10 are substantially coincident. In the embodiment illustrated, two tool spindles 36 are journaled in carbide bearings 38 mounted in individual bores 37 formed parallel to the axis of the spindle housing 16. Although only two spindles 36 are illustrated, it will be apparent to those skilled in the art that merely by changing their dimensions, additional spindles may be mounted in additional bores 37 in the spindle housing 16. The particular location of the bores 37 is determined by the location of the holes desired in the work piece. A spur gear 40 is rigidly mounted as by pins 42 at one end of each of the tool spindles 36 so as to mesh with the internal ring gear 32. Each tool spindle 36 has a central bore 44 adapted to receive and secure therein, as by locking screws 46, appropriate cutting tools such as a twist drill, a reamer, a counterbore, etc. If desired, each tool spindle 36 may be provided with conventional oil slinger grooves (not shown) for lubrication purposes.

In its operation the elongated portion 11 of the shank 10 is inserted into the turret of an automatic screw machine such that it's bevel gear 28 engages the large bevel gear in the turret. Power is transmitted through the discontinuous drive shaft which includes the drive spindle 24, the ring gear 32, and the spur gears 40 to the tool spindles 36. Power transmitted by the drive spindle 24 is transmitted equally through the spur gears 40 to each of the tool spindles 36. It should be noted that the relatively short length of the machine tool attachment of this invention allows for greater drilling accuracy and good repetition of hole pattern location.

By the use of the discontinuous drive shaft, several advantages are realized. The spindle housing 16 can be shifted by a small distance, typically $\frac{1}{100}$ of an inch, by loosening the screws 20 and repositioning the spindle housing 16. By this technique small misalignments between the turret of the screw machine and the workpiece may be corrected without having to reposition the workpiece. Additionally, for high speed operation, the carbide bearings 38 are lapped desirably to a .0002 inch running fit with each of the spindles 36 to enable them to be run at speeds in excess at 15,000 r.p.m. The construction of the spindle assembly is such as to allow all of the parts to be readily and easily disassembled for repair or replacement of worn parts simply by removing the screws 20.

By the use of this invention, two or more tool spindles 36 may be used at each turret location of an automatic screw machine. This provides savings of time. For example, in drilling plural holes in a work piece, the necessity for removing the work piece from its mounting and repositioning it with respect to the turret is obviated. This step in itself eliminates the necessity for degreasing the work piece prior to remounting. An additional advantage is that the same multiple spindle attachment may be used to deburr the holes made in a single work piece. The holes may thus be deburred simultaneously instead of individually as has been necessary in the past.

For example, in a typical operation wherein it is desired to bore a hole at a center point in a work piece and then bore several additional holes about the center point the present invention is used to advantage. In this case four turret drilling attachments may be used, one each for the center hole boring and deburring and one multiple drilling attachment of this invention each for the outside holes boring and deburring. With this arrangement the workpiece is set up only once along the center line for boring the center hole. The automatic screw machine is turned on and the turret drilling attachments successively (1) drill the center hole, (2) deburr the center hole, (3) simultaneously drill the outside holes, and (4) simultaneously deburr the outside holes.

In the prior art this one operation using applicants' invention would have required the additional steps of (1) removing the workpiece from the machine after each hole is bored and deburred, (2) degreasing the work piece, (3) inspecting the work piece, and (4) setting up the work piece on a new center line. These steps would be repeatedly essentially for each and every hole to be made.

Since many changes could be made in the above construction any of many apparently widely different embodiments of this invention could be made without departing from the scope thereof, it is intended that all matter contained in the above description or shown in the accompanying drawings shall be interpreted as illustrative and not in a limiting sense.

We claim:
1. A machine tool attachment comprising:
a hollow, cylindrical-shaped shank having a major axis, one end of said shank having an enlarged, cup-shaped flange,
a drive spindle rotatably mounted in the hollow shank and having an enlarged cup-shaped flange at one end adapted to seat in the cup-shaped flange of said shank,
an internal ring gear fixedly mounted in the cup-shaped flange of said drive spindle,
drive connecting means mounted on the other end of said drive spindle opposite said one end,
a cylindrical-shaped spindle housing having an enlarged flange at one end, said spindle housing being concentrically attached to said shank flanges,
at least a first and a second spindle each rotatably mounted in a bore in said spindle housing and being adapted to carry an operating tool,
on each of said first and second spindles having a spur gear rigidly mounted on one end so as to mesh with said internal ring gear, whereby torque transmitted to said drive spindle is simultaneously transmitted to each of said first and second spindles.
2. The attachment set forth in claim 1 wherein said drive spindle and shank flanges are adjustably attached together, thereby to permit selective positioning of the major axis of said spindle housing relative to the major axis of said shank.

References Cited in the file of this patent

UNITED STATES PATENTS

| | | |
|---|---|---|
| 282,251 | Adams | July 31, 1883 |
| 457,606 | Norcross | Aug. 11, 1891 |
| 2,019,669 | Furness | Nov. 5, 1935 |